Patented Dec. 8, 1936

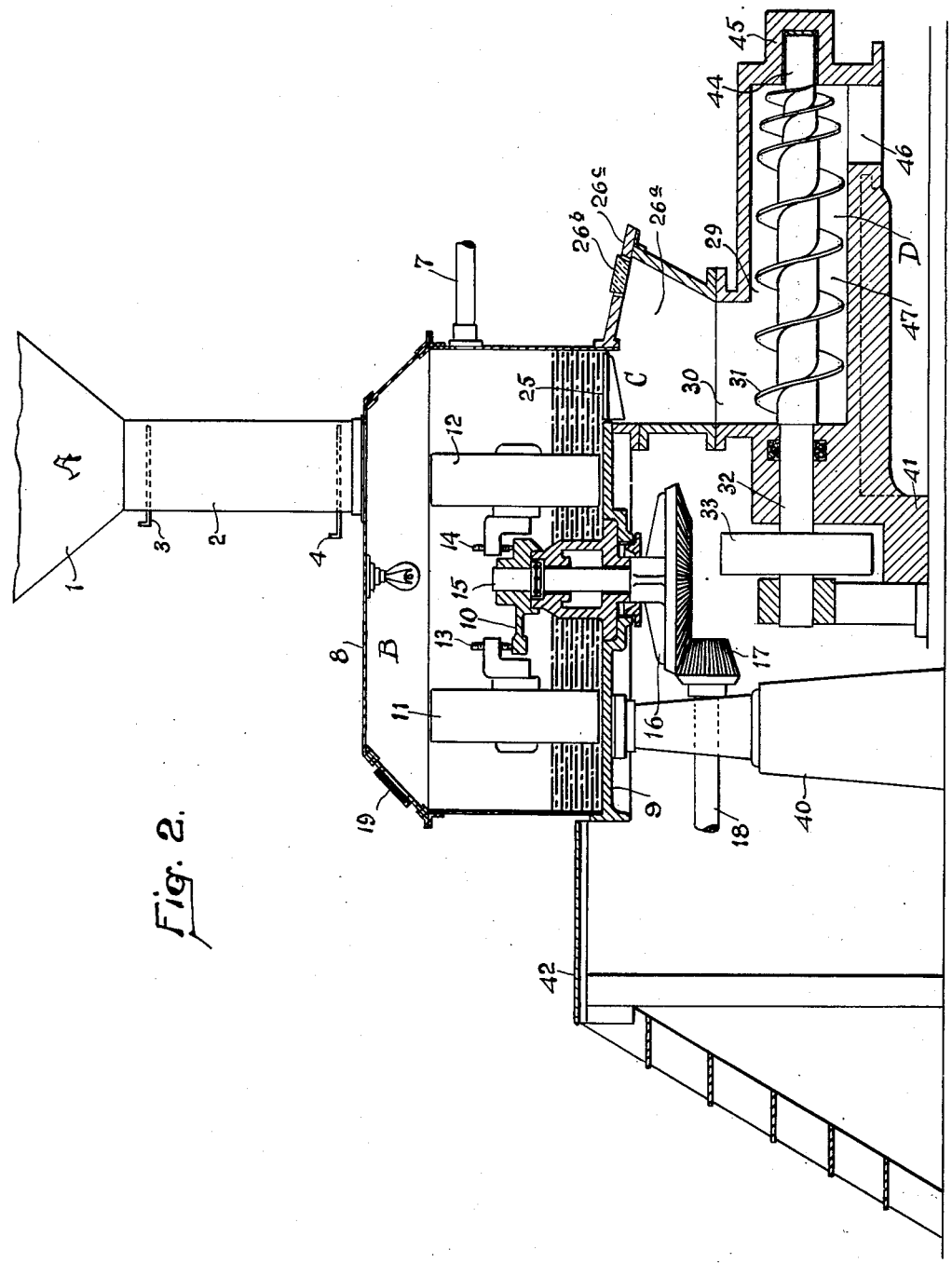

2,063,266

UNITED STATES PATENT OFFICE 2,063,266

MIXER FOR DE-AIRING CLAY

Louis Robert Pape, Dayton, Ohio, and Lester B. Knight, Jr., Chicago, Ill., assignors to Herbert S. Simpson, Chicago, Ill.

Application March 30, 1933, Serial No. 663,570

5 Claims. (Cl. 83—45)

This invention relates to apparatus for and a method of mulling materials and likewise de-aerating such materials in accompaniment with the mulling operations.

The principal object of our invention is to provide apparatus for and a method of mulling granular materials, especially clays, and also removing the air from the material while it is being treated in the various stages of the operations hereinafter more particularly described.

Another object of the invention is to conduct mulling operations within a vacuum chamber.

Another object is to measure and admit materials to such apparatus while subjecting these to a de-aerating agency.

Another object is to de-aerate the materials being treated while the mulling is being conducted.

Another object is to continue the de-aeration of the materials while they are being transferred to a compressing instrumentality.

Another object is to extract the air from the materials while they are undergoing a compression and extrusion operation, as in an auger machine.

It is a further object of our invention to treat the materials being mulled and de-aerated in batches; to discharge them after mulling and de-aeration into a hopper; thereafter to deliver them by some form of pressing, conveying or extrusion mechanism, at the same time maintaining the vacuum seal by utilizing the de-aerated, mulled materials for that purpose and then discharging such materials into tote boxes or the like for delivery to various molding stations.

An additional object is to provide a storage hopper between the muller and the extrusion mechanism so that the material can be treated in batches, and the extrusion mechanism, when conveying material, will both create a vacuum seal and also feed the material at a uniform rate. It will be understood that other mechanisms than an auger extrusion mechanism may be employed for this purpose, but it is typical of our desires in this matter.

In the drawings:

Figure 2 is a section through a modified form of collection apparatus for a batch and the delivery thereof to a shape machine or tote boxes, while maintaining a vacuum seal.

Figure 1:
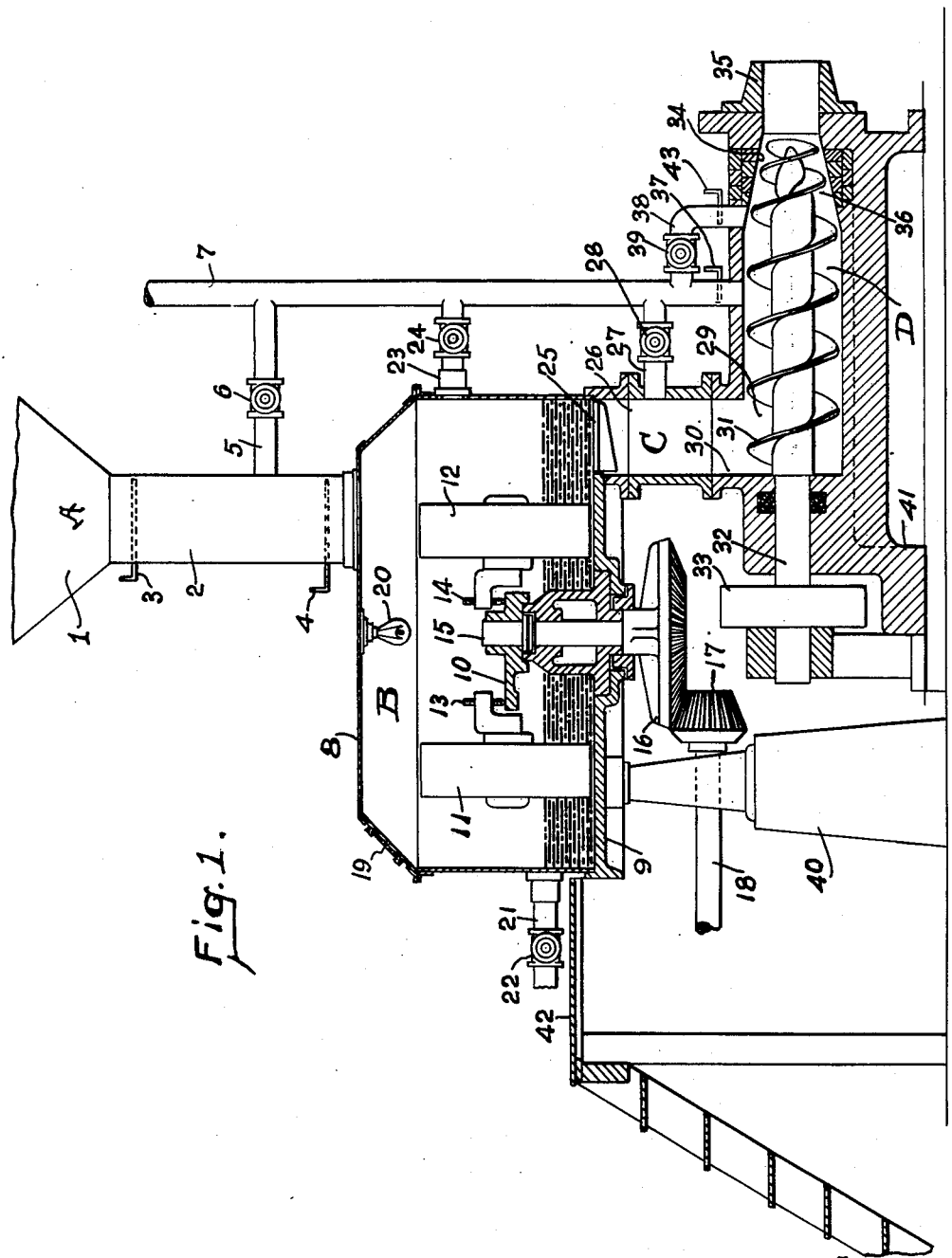
Figure 1 shows an assembly of the mulling machine in its vacuum chamber, with the entrance and exit ducts and the auger mill.

In general, the apparatus consists of material supplying mechanism A, comprising a hopper, a measuring chamber and an entrance portal; a mulling apparatus B, comprising a mulling machine in a vacuum chamber; an exit duct C with a valve communicating thereto from the mulling chamber; and, finally, an auger mill D, comprising a screw conveyor with a compressing instrumentality and an extruding nozzle. Conduits communicate with each of these sub-divisions of the apparatus, leading to a vacuum pump which exhausts the air from the several compartments of the machine.

Referring to the drawings in detail, 1 is a hopper or material container which is separated from a measuring chamber 2 by a gate or valve 3. At the opposite end of the measuring chamber 2 is a second gate or valve 4. Leading from the measuring chamber 2 is a conduit 5 with a valve 6 regulating communication between the measuring chamber 2 and the main conduit 7, which in turn is connected with a vacuum pump (not shown).

Beyond the gate or valve 4 the measuring chamber opens into a muller chamber 8 which contains a mulling machine consisting generally of a mulling pan 9 and a revolving crosshead 10 to which are connected mullers 11 and 12. These mullers act like rollers and are adjustable up or down by the screws 13 and 14, respectively. The muller crosshead 10 is drivingly connected with a shaft 15 which in turn communicates with a source of power supply through such transmission instrumentalities as are necessary, such as the bevel gear 16 and the pinion 17 connected to the shaft 18.

The muller chamber 8 is made air tight, and contains an air tight window 19 and a source of illumination 20, by the aid of which the operations of the muller may be watched from the outside of the muller chamber 8.

Opening into the muller chamber 8 is a conduit 21 with a valve 22 regulating the communication between the muller chamber and a source of liquid supply, usually water.

Also leading from the muller chamber 8 is another conduit 23 with a valve 24 regulating communication between the muller chamber and the main conduit 7.

In the muller chamber 8 is a gate or valve 25 which opens into a passage 26 which communicates with an auger machine. From the chamber 26 leads a conduit 27 into the main conduit 7, communication therebetween being regulated by the valve 28.

The auger machine consists of a chamber 29 enclosed by walls 30 and containing a screw or auger 31 drivingly connected with a source of power, such as through the shaft 32 and the gear 33. The auger chamber is elongated to fit the auger, and near its exit end has a tapering part 34 which ends in an extrusion port or nozzle 35. The auger 31 likewise tapers, as at 36, to fit the tapered part 34 of its chamber, and the pitch of the screw preferably becomes lessened. Leading from the auger chamber 29 is a section of the main conduit 7, communication therebetween being regulated by the valve 37. From the tapered portion 34 of the auger chamber leads a conduit 38 to the main conduit 7, communication therebetween being regulated by the valve 39.

The machine as a whole is supported on a suitable base, such as the sub-structure 40 for the muller, and the base 41 for the auger part of the machine. For the convenience of the operator, a platform 42 is installed adjacent to the muller chamber, by means of which the operator can watch the operations in the muller chamber 19 through the window 19.

The mode of operation of the machine is as follows: the material to be treated is placed in the hopper 1, and passes downward into the measuring chamber 2 when the gate 3 is opened, the gate 4 being closed. This material may be clay, sand, or other substances which are suitable for such treatment. When the measuring chamber 2 becomes filled with the material, the gate 3 is closed. Meanwhile the valve 6 has been opened, and the vacuum pump put into operation, so that air is withdrawn from the material in the measuring chamber 2 through the conduits 5 and 7. After a suitable period of de-aeration in the measuring chamber 2 the gate 4 is opened and the material passes into the muller chamber. Here the material is treated by the mullers 11 and 12, adjusted to a suitable height above the muller pan 9. The muller crosshead 10 turns about its axis and carries with it the mullers 11 and 12, which thereby accomplish the mulling operation. If the materials do not possess a suitable plasticity, liquid is added by opening the valve 22 in the conduit 21 leading to the source of liquid supply. Meanwhile the operations are watched by the operator through the window 19. Meanwhile the valve 24 in the conduit 23 leading to the main conduit 7 has been opened, permitting the further withdrawal of air from the materials being mulled and from the muller chamber 8. After the treatment of the material has reached a suitable stage, the gate 25 is opened and the material passes onward into the auger machine by way of the passage 26. While the material is thus passing onward, it is being further de-aerated by air being withdrawn through the conduit 27 leading to the main conduit 7, the valve 28 being open.

Meanwhile the auger 31 in the auger chamber 29 has been put in motion and the material is conveyed along the elongated portion of the chamber by the revolving auger 31. During its passage, air is further removed from the auger chamber and the material through the main conduit 7 by means of the previously mentioned vacuum pump, the valve 37 being opened. The material now passes into the tapered or constricted portion 34 of the auger chamber where it undergoes compression, the air squeezed out at this stage of operations being removed by the conduit 38, leading into the main conduit 7, the valves 39 and 43 being open. The material after being thus compressed passes out of the auger machine into the nozzle 35 from whence it is extruded and conveyed to the place where it is to be used by any suitable conveying instrumentalities.

Our invention is particularly adapted to the removal of air from clay in a plastic wet mass, an operation hitherto found quite difficult. While air may be easily removed from dry clay, the wet pan method is considered to result in a superior product where the so-called "stiff mud process" is used, such as in making hand-made refractories and sewer pipe. In our machine and method, the gases forced out of the plastic clay are removed by an air extractor, and the various chambers of our machine are sealed against the entrance of air so that a reasonably high degree of vacuum, for example 27 to 28 inches of mercury, can be obtained. Our machine and method are thus particularly well adapted for the manufacture of fire brick, special refractory shapes, ordinary brick, tile and sewer pipe.

Referring particularly to Figure 2, it will be noted that when a supply of material to be mulled and de-aerated known as a batch is delivered from the hopper 1 through the measuring chamber 2 to the muller B, it is there de-aerated and mulled in a batch. Due to the fact that the outside of the muller wheel tends to move at a greater speed than the inside, while bodily rotating on its own axis and bodily moving about the vertical axis of a muller driving shaft 15, a mulling action is performed. By this mulling action any entrained or included air in the clay is released by breaking down the air cells or bubbles in the clay, which form as containers for the air, and due to the exhaustion of the air by the vacuum pump, the air is thus removed. When this operation has been satisfactorily performed, then the batch is delivered into the hopper or storage chamber 26a which has a glass inspection opening 26b in the cover 26c. In the bottom of this storage hopper, the top of which is closed by the gate 25, is the auger 31. In this modification the auger has its extreme right-hand thrust end 44 mounted in a thrust bearing cap 45 while the discharge opening is at right angles as at 46 to the direction of movement of material, as imparted to it by the auger. This leaves an extended area around the auger filled by the material as at 47, forming a vacuum seal. The batch, therefore, is maintained in its air-free condition until discharged through the opening 46 into a tote box or to some form of machine for further forming and treating the products so produced.

It will be understood that we desire to comprehend within our invention such modifications as may be necessary to adapt it to varying conditions and uses. By this invention we provide a plastic coat on each part of the aggregate, which coat is air-free, permitting of a homogeneous body, the particles of which adhere to one another in a dense, air-free mass.

To further elaborate upon what takes place in the combined action of mulling and de-aerating, what is actually done is to remove the thin film of air which is present surrounding each of the particles of materials in the mass regardless of the smallness of the particle size. This film of air retards the complete wetting of the particles with the liquid. When the film of air is removed, the complete wetting of the particles is accomplished very rapidly due to the mulling or rubbing action of the muller. The action of the muller breaking up the air film by this rubbing action of the muller, as well as permitting the access of the wetting material to the particles, not only provides for a complete wetting but also for a complete dispersion of the liquid over the surface of the particles as there is a thorough distribution of the liquid over the surface of the particles when the film of air is removed by the combined action of the mullers and the vacuum carrying away the air. The muller breaks up the air film and the vacuum condition removes the air film.

Having thus fully described our invention, what we claim as new and desire to secure by Letters Patent is:

1. The combination with a chamber having a muller therein comprising a bed plate and a plurality of rotating members pressing thereon, of sealed means for supplying moistened material thereto, means for supplying liquid to said chamber to increase the plasticity of said moistened material, means for maintaining a sub-atmospheric pressure within said muller chamber, and means for discharging said moistened material and for preventing the ingress of air whereby to simultaneously grind and knead said moistened material while withdrawing air therefrom.

2. The combination with a chamber having a muller therein comprising a bed plate and a plurality of rotating members pressing thereon, of sealed means for supplying moistened material thereto, means for supplying liquid to said chamber to increase the plasticity of said moistened material, means for maintaining a sub-atmospheric pressure within said muller chamber, means for discharging said moistened material and for preventing the ingress of air whereby to simultaneously grind and knead said moistened material while withdrawing air therefrom, and means for further withdrawing air from said discharging means.

3. The combination with a chamber having a muller therein comprising a bed plate and a plurality of rotating members pressing thereon, of sealed means for supplying moistened material thereto, means for supplying liquid to said chamber to increase the plasticity of said moistened material, means for maintaining a sub-atmospheric pressure within said muller chamber, a vacuum storage chamber beyond said muller chamber for receiving the ground and kneaded moistened material therefrom, and means for discharging said moistened material and for preventing the ingress of air whereby to simultaneously grind and knead said moistened material and increase its plasticity while withdrawing air therefrom.

4. A method of treating clay materials comprising the steps of moistening the materials, supporting the materials in a layer, rolling and pressing the materials to mix and knead the same, removing air from the surface of the materials while rolling and kneading whereby air bubbles are pressed from the materials, and discharging the materials from the layer.

5. A method of treating clay materials comprising the steps of moistening the materials, supporting the materials in a layer, rolling and pressing the materials to mix and knead the same, adding liquid to the materials while rolling and kneading to increase the plasticity of the materials, removing air from the surface of the materials while rolling and kneading whereby air bubbles are pressed from the materials, and discharging the materials from the layer.

LOUIS ROBERT PAPE.
LESTER B. KNIGHT, Jr.